United States Patent [19]
Wodrich et al.

[11] 3,853,528
[45] Dec. 10, 1974

[54] SLOT NOZZLE FOR ISOTOPE SEPARATION OF GASEOUS COMPOUNDS

[75] Inventors: Goetz Werner Wodrich; Gerhard Heckh; Manfred Zerweckh, all of Karlsruhe, Germany

[73] Assignee: Siemens Aktiengesellschaft, Berlin and Munich, Germany

[22] Filed: Feb. 8, 1971

[21] Appl. No.: 113,173

[30] Foreign Application Priority Data
Feb. 27, 1970  Germany............................ 2009265

[52] U.S. Cl............................. 55/434, 55/17, 156/3
[51] Int. Cl............................................. B01d 50/20
[58] Field of Search ................ 55/434, 17; 161/109; 156/3, 256, 252, 3; 29/157 C

[56] References Cited
UNITED STATES PATENTS

| | | | |
|---|---|---|---|
| 2,273,830 | 2/1942 | Brierly et al. ...................... | 29/157 C |
| 3,301,939 | 1/1967 | Krasnow ................................ | 156/3 |
| 3,362,131 | 1/1968 | Becker.................................... | 55/17 |
| 3,492,523 | 1/1970 | Smith et al............................. | 156/3 |
| 3,668,080 | 6/1972 | Weber et al. ........................... | 55/17 |

*Primary Examiner*—Bernard Nozick
*Attorney, Agent, or Firm*—Hill, Gross, Simpson, Van Santen, Steadman, Chiara & Simpson

[57] ABSTRACT

Slot nozzle assembly for use in separating isotopes from a gaseous compound comprises a stack of thin foils which are superposed one upon the other in a stack with preformed identically configured slot nozzles formed in the foils. The foils are stacked together with the preformed slot nozzle outlines in congruity with one another and the foils are then bonded together in the stack.

The method of making such foils includes etching the slot nozzle outlines in the foils independently prior to stacking and subsequently bonding the superposed foils together.

4 Claims, 4 Drawing Figures

3,853,528

SLOT NOZZLE FOR ISOTOPE SEPARATION OF GASEOUS COMPOUNDS

BACKGROUND OF THE INVENTION

Field of the Invention

Physical separation of isotopes of an element to provide for instance a material of isotopic composition different from that which occurs in nature can be performed through several different processes. Such a process may be particularly important in a number of fields such as the nuclear energy field since individual isotopes may have completely different nuclear properties. In recent times it has been proposed that isotopes can be separated by allowing a gaseous compound to pass through a properly shaped nozzle which may be referred to as a "slot nozzle." Such slot nozzle arrangements and their use in practice is for instance described in the essay entitled "Entmischung der Uranisotope in Einer Zehnstufigen Trennduesenversuchsanlage" [Separation of Uranium Isotopes in a Ten Stage Separating Nozzle Testing Device] by E. W. Becker, G. Frey, R. Schuette and D. Seidel in the magazine "Atom Wirtschaft" [Atom Economy] of July 1968, pp. 359 through 362. In such slot nozzle separation devices gas is passed through a supply channel and the gaseous isotope mixture which is guided through the gas supply channel and is speeded up to supersonic speed by passing the isotope mixture through a so-called Lavall nozzle against a deflection wall. The heavier isotopes adhere to the deflection wall and the lighter ones tend to separate slightly from it and so-called "peeler" is interposed in the path of these separated isotopes to pass them respectively to heavy and light isotope carry-off channels.

In order to effectively perform this operation rather long slot nozzle sections are required and such long slot nozzles with the extremely fine tolerances required could heretofore only be produced with the greatest difficulty.

The present invention involves a novel slot nozzle assembly having desired elongated slot nozzles formed therein and the method of making such nozzles. In the preferred method of manufacture, a number of thin metal foils are etched through from one side to the other in areas corresponding precisely to the desired cross-sectional configuration of the elongated slot nozzles to be provided. Subsequently, a number of such foils are superposed one upon the other with the cross-sectionally configured slot nozzles therein lying congruently with one another to define in combination an elongated slot nozzle. The several foils are then bonded together form the desired slot nozzle assembly. The end product, of course, may have a large number of slot nozzles formed within it and is made up of a series of stacked foils.

It is therefore an object of the present invention to provide a slot nozzle assembly wherein the slot nozzle may be accurately dimensioned and the desired elongated slot nozzles may be provided and to a method of manufacturing such slot nozzle assemblies which includes preforming a plurality of foils with desired slot nozzle cross sections and subsequently stacking the several foils upon one another to form the elongated slot nozzles.

BRIEF DESCRIPTION OF THE DRAWINGS

These and other objects, features and advantages of the present invention will become apparent from time to time as the following specification proceeds and with reference to the accompanying drawings wherein.

Figure 1:
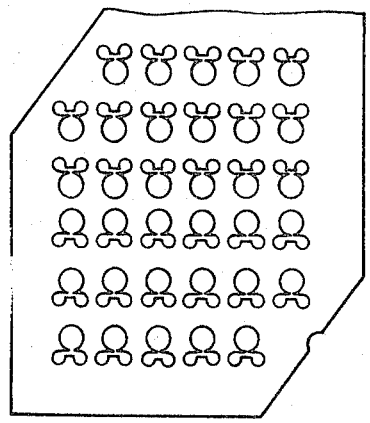
FIG. 1 illustrates an individual foil with etched openings formed therein corresponding to the desired cross sectional configuration of a slot nozzle.

Referring initially to FIG. 1, a foil is shown which is preferably formed of a copper-beryllium alloy and which has a series of openings formed therein corresponding to the desired cross-sectional configuration of an elongated slot nozzle. On the particular foil illustrated in FIG. 1 34 nozzle cross sections are illustrated but it will be understood that in practice several hundred nozzle cross sections may be provided in a single foil. The copper-beryllium alloy foil preferably has a thickness on the order of about 0.015 mm. and the openings therein provided are preferably formed by etching.

For instance, it would be possible to mask all portions of the foil but for those portions which are to define the slot nozzles and such masking could of course be carried out on both sides of the foil. An etching compound may then be applied directly to the foil and all such portions of the foil as are unmasked will be etched away leaving the openings illustrated in FIG. 1.

Figure 2:
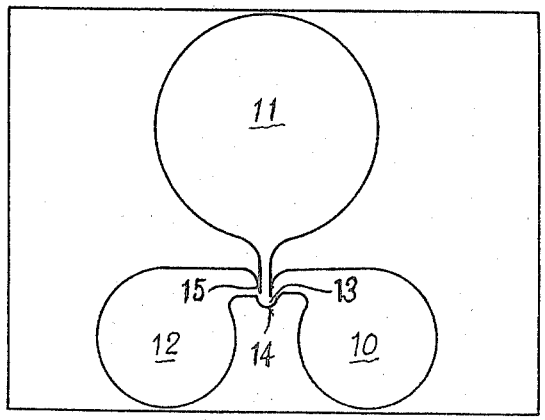
FIG. 2 is an enlarged representation of one of the slot nozzle cross sections of FIG. 1.
Figure 3:
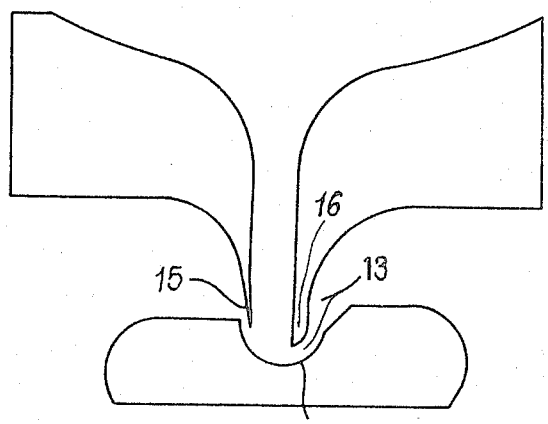
FIG. 3 is a still further enlarged fragmentary view of a portion of the slot nozzle showing the Lavall nozzle, the deflector wall, and peeler.

FIGS. 2 and 3 illustrate in greater detail the particular design of a slot nozzle wherein it may be seen how critical the particular design and dimension of the opening and the walls defining the opening are.

The slot nozzle opening comprises three separate channels which may be said to consist of three separate lobes. The channel 10 comprises the gas supply channel wherein an isotope mixture is passed into the device. The larger center lobe 11 comprises the light isotope carry-off channel and the left hand lobe 12 comprises the heavy isotope carry-off channel.

In operation the slot nozzle assembly created by the stacked foils functions substantially as follows. A gaseous isotope mixture is passed down the supply channel 10 and the light and heavy isotopes are passed through the Lavall nozzle 13 and against the deflection wall 14 and then tend to separate from one another. The heavier isotopes cling to the deflection wall while the lighter isotopes tend to separate from it. A sharp-edged peeler 15 is interposed in the path of the isotopes passing from the deflection wall 14 and this peeler acts to direct the heavier isotopes clinging to the deflection wall 14 into the heavy isotope carry-off channel 12 and to direct the lighter isotopes into the channel 11.

As heretofore mentioned, details of the operation of this form of nozzle can be had by reference to the publication already above referred to.

For illustrative purposes it may be understood that a desired slot nozzle assembly may have gas supply and heavy isotope carry-off channels having a dimension on the order of 2.6 mm. The guiding metal lip 16 providing the converging wall of the nozzle will have a bending radius of 0.06 mm. The deflection wall has a radius of curvature of 0.1 mm. and the rounding edge of the peeler has a radius of 0.004 mm.

The slot nozzle assembly is formed by placing a number of foils such as the foil illustrated in FIG. 1 in superposed relation with respect to one another with the openings formed within such foils in exact correspondence with one another. The resulting stack of foils is then preferably welded together although they may otherwise be bonded by means of gluing or soldering or the like.

Figure 4:
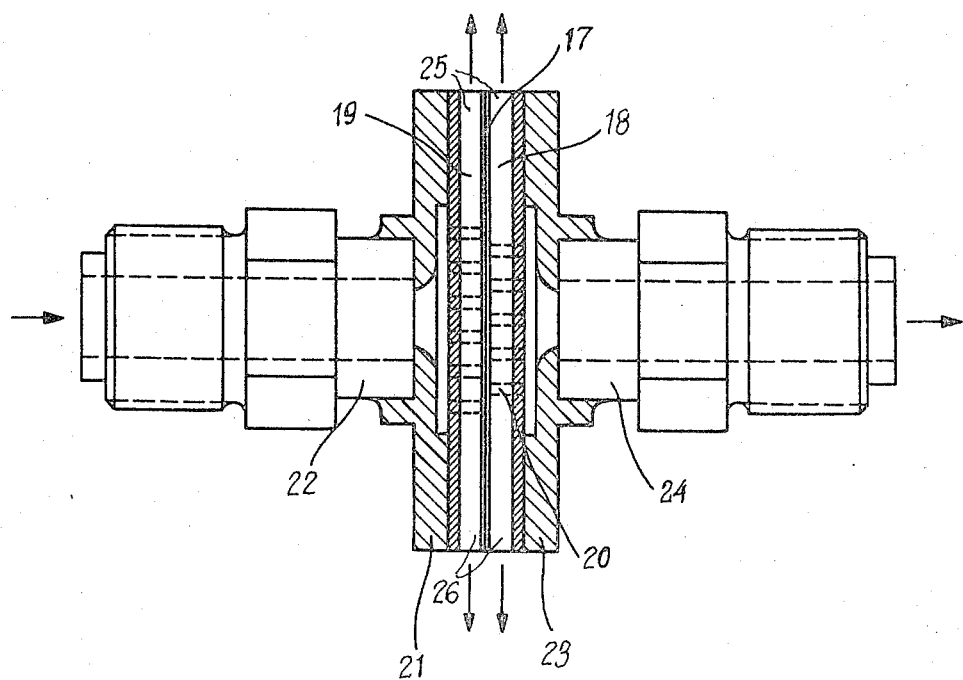
FIG. 4 is a partially elevational, partially sectional, view of a slot nozzle assembly including the means for feeding the device with an isotope mixture and for carrying off the light and heavy isotopes.

A complete slot nozzle assembly including means for feeding the isotope mixture to the foil stack and carrying away the separated isotopes is illustrated in FIG. 4.

In that drawing an arrangement has been shown which includes a foil stack consisting of some 50 individual foils which are bonded together to form a foil stack having a thickness of approximately 0.075 mm. The foil stack 17 is interposed between two end plates 18 and 19 and the end plates themselves have openings 20 bored therethrough to permit isotope flow to and from the foil stack.

A housing flange 21 secures the end plate 19 and has a teflon nipple 22 fitted thereon. A gaseous isotope mixture passes into the nipple 22 and through a passageway formed within it and the cooperating housing flange 21 and thence through the openings 20 to the foil stack. Gas is then carried off through a like assembly including housing flange 23 and teflon nipple 24. The lighter fraction of the isotope mixture is carried off through openings 25 and 26.

While the present invention has been disclosed herein by reference to specific illustrative embodiments thereof, many changes and modifications will become apparent to those skilled in the art without departing from the spirit and scope of the invention, and it is to be understood that I wish to include within the patent warranted hereon all such changes and modifications as may be reasonably and properly included within the scope of my contribution to the art.

What we claim is:

1. A slot nozzle for isotope separation of a gaseous compound, comprising:

a plurality of thin foils each including means defining a plurality of identically configured openings therethrough each having at least three interconnected lobes, said foils superposed to form a stack with said openings arranged in complete congruity with said lobes defining a gas supply channel, a light isotope carry-off channel and a heavy isotope carry-off channel, and said opening defining means for each of said openings including a nozzle having a deflection wall between said supply channel lobe and said heavy isotope carry-off channel lobe, and a peeler extending adjacent said deflection wall to separate the heavy isotopes from the light isotopes as the former tend to cling to the deflection wall in passing through said nozzle.

2. A slot nozzle constructed in accordance with claim 1, and further including means directing a gas flow to said supply channel and separately collecting isotope flow from said carry-off channels.

3. A slot nozzle constructed in accordance with claim 1 wherein:

said foils are formed of a metal alloy and are welded together in the stack to form said nozzle.

4. A slot nozzle constructed in accordance with claim 2 wherein the slot nozzle formed by the stacked foils is several times longer than the thickness of one individual foil.

* * * * *